(12) United States Patent
Barnes et al.

(10) Patent No.: US 10,280,987 B2
(45) Date of Patent: May 7, 2019

(54) AXIAL MOVEMENT COMPENSATION OF CLUTCH ACTUATION DEVICE

(71) Applicant: SCHAEFFLER TECHNOLOGIES AG & CO. KG, Herzogenaurach (DE)

(72) Inventors: Jay Barnes, Clinton Township, MI (US); Shaun Tate, Grand Blanc, MI (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 144 days.

(21) Appl. No.: 15/494,954

(22) Filed: Apr. 24, 2017

(65) Prior Publication Data

US 2018/0306249 A1 Oct. 25, 2018

(51) Int. Cl.
*F16D 23/12* (2006.01)
*B60K 17/02* (2006.01)
*B60K 17/34* (2006.01)
*F16D 13/52* (2006.01)

(52) U.S. Cl.
CPC .............. *F16D 23/12* (2013.01); *B60K 17/02* (2013.01); *B60K 17/34* (2013.01); *F16D 13/52* (2013.01); *F16D 2023/123* (2013.01)

(58) Field of Classification Search
CPC .... F16D 23/12; F16D 2023/123; F16D 13/04; F16D 13/52; F16D 13/54; F16D 2125/36; B60K 17/02; B60K 17/34
See application file for complete search history.

(56) References Cited

U.S. PATENT DOCUMENTS

| 4,068,746 | A | 1/1978 | Munechika |
| 6,182,808 | B1 * | 2/2001 | Walton ................ B60K 17/351 |
| | | | 192/35 |
| 7,806,797 | B2 | 10/2010 | Gassmann et al. |
| 9,033,844 | B2 | 5/2015 | Schimpf et al. |
| 2005/0050973 | A1 | 3/2005 | Olschewski et al. |

(Continued)

FOREIGN PATENT DOCUMENTS

| DE | 102013206735 A1 | 10/2014 |
| EP | 2505859 B1 | 9/2015 |
| WO | 2009109255 A2 | 9/2009 |

OTHER PUBLICATIONS

U.S. Appl. No. 14/963,748, filed Dec. 9, 2015.

*Primary Examiner* — Charles A Fox
*Assistant Examiner* — Lori Wu
(74) *Attorney, Agent, or Firm* — Brooks Kushman P.C.

(57) ABSTRACT

A clutch actuation device selectively engages a clutch. The clutch actuation device includes two plates, at least one of which being able to rotate relative to the other. Between the two plates is a rounded member, such as a ball, housed within opposing grooves in the respective plates. As the plates rotate relative to one another, the rounded member forces the plates to separate axially from one another. This can engage the clutch. A third plate is placed at a location axially spaced from the second plate. The third plate limits movement of the second plate when moving to the extended position, assuring the second plate does not over-translate axially. A resilient member may be provided between the third plate and a housing. The resilient member can be tuned to properly inhibit the axial movement of the second and third plates according to the packaging constraints.

19 Claims, 3 Drawing Sheets

(56) References Cited

U.S. PATENT DOCUMENTS

| | | | |
|---|---|---|---|
| 2007/0144861 A1* | 6/2007 | Yamasaki | F16D 13/54 |
| | | | 192/70.23 |
| 2009/0163313 A1 | 6/2009 | Gassmann et al. | |
| 2011/0179906 A1 | 7/2011 | Juenemann et al. | |
| 2014/0174878 A1* | 6/2014 | Hemphill | F16D 25/0638 |
| | | | 192/70.23 |
| 2016/0238107 A1* | 8/2016 | Hirota | F16D 28/00 |
| 2016/0340159 A1* | 11/2016 | Maghsoodi | B66D 1/12 |

\* cited by examiner

AXIAL MOVEMENT COMPENSATION OF CLUTCH ACTUATION DEVICE

TECHNICAL FIELD

The present disclosure relates to a device for compensating axial movement of an actuation device that engages and disengages a clutch in a vehicle.

BACKGROUND

Clutches selectively couple two rotating elements within a vehicle. Clutch actuation devices are known in the art for selectively engaging and disengaging the clutch. For example, when torque is needed to be transmitted through the clutch, the actuation device applies a load to an actuator plate which locks up the clutch disks within the clutch housing. Some clutch actuation devices move axially to engage the actuator plate.

SUMMARY

According to one embodiment, a clutch for selectively connecting an all-wheel drive system in a vehicle is provided. The clutch includes a ramped clutch actuation device including first and second plates configured to be variably spaced apart from each other between a first distance and a second distance. At least a portion of the ramped clutch actuation device is configured to rotate to change a distance between the first and second plates from the first distance to a second distance. A third plate is provided adjacent the second plate and is configured to limit axial movement of the second plate when the distance between the first and second plates is being changed between the first distance and the second distance.

A resilient member such as a spring may contact the third plate and may be configured to limit axial movement of the third plate.

The third plate may have a first recess facing the second plate, wherein the first recess receives a portion of the second plate. The third plate may have a second recess facing away from the second plate that receives a spring. The spring may be coupled to a housing and to the third plate.

In another embodiment, a system for compensating axial travel of a clutch actuation device includes a housing, and a ramped clutch actuation device that includes a first plate and a second plate coaxial with the first plate. The second plate is configured to translate axially relative to the first plate. A resilient member such as a spring is located axially between the second plate and the housing. The spring is configured to inhibit the axial translation of the second plate.

In another embodiment, a clutch actuation device includes a first plate defining a first groove with a ramped profile. A second plate is coupled to the first plate and defines a second groove with a ramped profile. A rounded member is disposed within the first and second grooves. The rounded member is configured to cause axial movement of the second plate relative to the first plate as the rounded member translates along the ramped profile of the first and second groove. A spring is configured to limit the axial movement of the second plate.

A third plate may be provided between the second plate and a housing. The spring may be located between the third plate and the housing. The spring and third plate may cooperate to define a stop or limiting point at which the second plate can no longer travel axially.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Clutches selectively couple two rotating elements within a vehicle. Clutch actuation devices are known in the art for selectively engaging and disengaging the clutch. For example, when torque is needed to be transmitted through the clutch, the actuation device applies a load to an actuator plate which locks up clutch discs within the clutch housing.

One type of clutch actuation device includes a hydraulic piston, in which hydraulic pressure is applied to a piston to close and open the clutch.

Another type of clutch actuation device is known as a "ball ramp" device. A spherical ball is disposed between two engaging plates, and nests within an inclined groove of one or both engaging plates. The ball translates along the inclined groove to selectively separate one of the plates from the other. In particular, as one of the plates is rotated relative to the other, the ball translates along the inclined groove, causing the plates to become more axially-spaced.

Such a clutch actuation device does not necessarily have to include a spherical ball. For example, U.S. patent application Ser. No. 14/963,748, which is hereby incorporated by reference, teaches a clutch actuation device having an elongated shaft with rounded ends between the plates rather than a spherical ball. The shaft rotates or pivots within the pockets to selectively space the clutches from one another, thereby selectively engaging the clutch.

A ball ramp clutch actuation device having a spherical ball, or a clutch actuation device having an elongated shaft such as in U.S. patent application Ser. No. 14/963,748, can both be referred to as "ramp clutch actuation devices" or "ramped clutch actuation devices," as both clutch actuation devices include ramped portions for either a ball or an elongated member.

Figure 1:
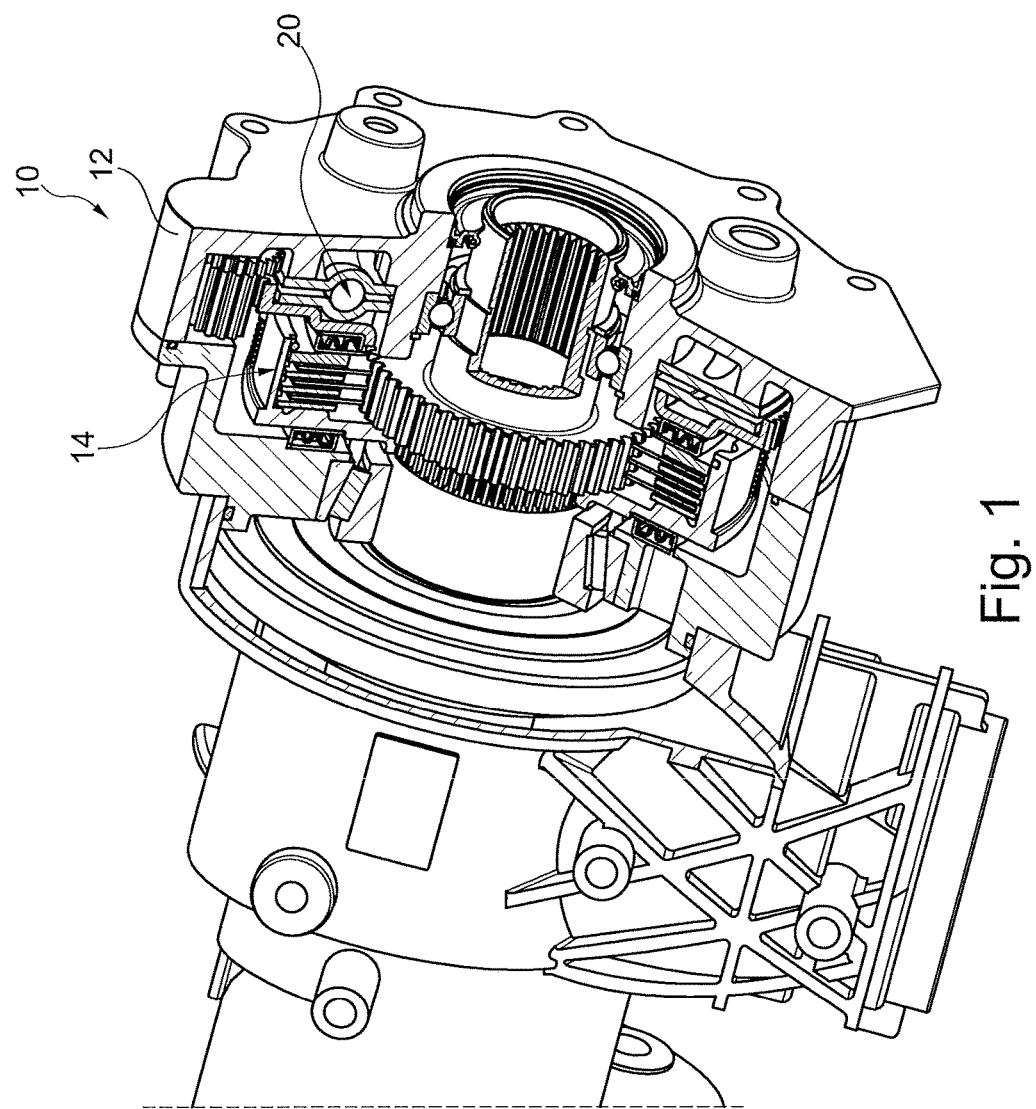
FIG. 1 is a sectional perspective view of a clutch device according to one embodiment.

FIG. 1 illustrates a clutch device 10 for selectively transmitting torque therethrough. The clutch device 10 can be part of an automatic all-wheel drive (AWD) activation system, for example. In such an AWD setting, the clutch device 10 selectively transfers torque to a drive axle when, for example, it is detected that a wheel is slipping. The clutch device 10 includes a casing or housing 12 having a multi-plate clutch pack 14 disposed therein. The clutch pack 14 is controlled to selectively compress in order to allow torque to transfer therethrough and to the drive axle. Also within the housing 12 is a clutch actuation device 20 which separates and compresses to selectively engage the clutch pack 14. The clutch actuation device 20 can be a ball ramp clutch described above.

The specific structure of FIG. 1 is not meant to be limiting, but is provided to give exemplary structural context for the clutch actuation device 20 for selectively engaging and disengaging a clutch. Additional structure provided to the assembly of FIG. 1 will be described with reference to FIGS. 2-3.

The clutch actuation device described above may be utilized for selectively engaging and disengaging all-wheel drive in the vehicle by selectively transferring torque through the device and to wheels. In such an axial disconnect system, excess axial travel of components, such as the plates of the clutch actuation device 20, may lead to slow or improper disconnect of the system. Excess axial travel therefore needs to be compensated or minimized to maintain performance of the system.

According to various embodiments described below and shown in FIGS. 2-3, the clutch device is equipped with a mechanical travel compensation disk or plate 30. The plate 30 is assembled axially between the housing 12 and the clutch actuation device 20, e.g., ball ramp clutch. As will be described, the plate 30 is provided with recesses on either axial side; one recess is for the ramped profile of the clutch actuation device, and another recess is for a spring between the plate 30 and the housing 12.

Figure 2:
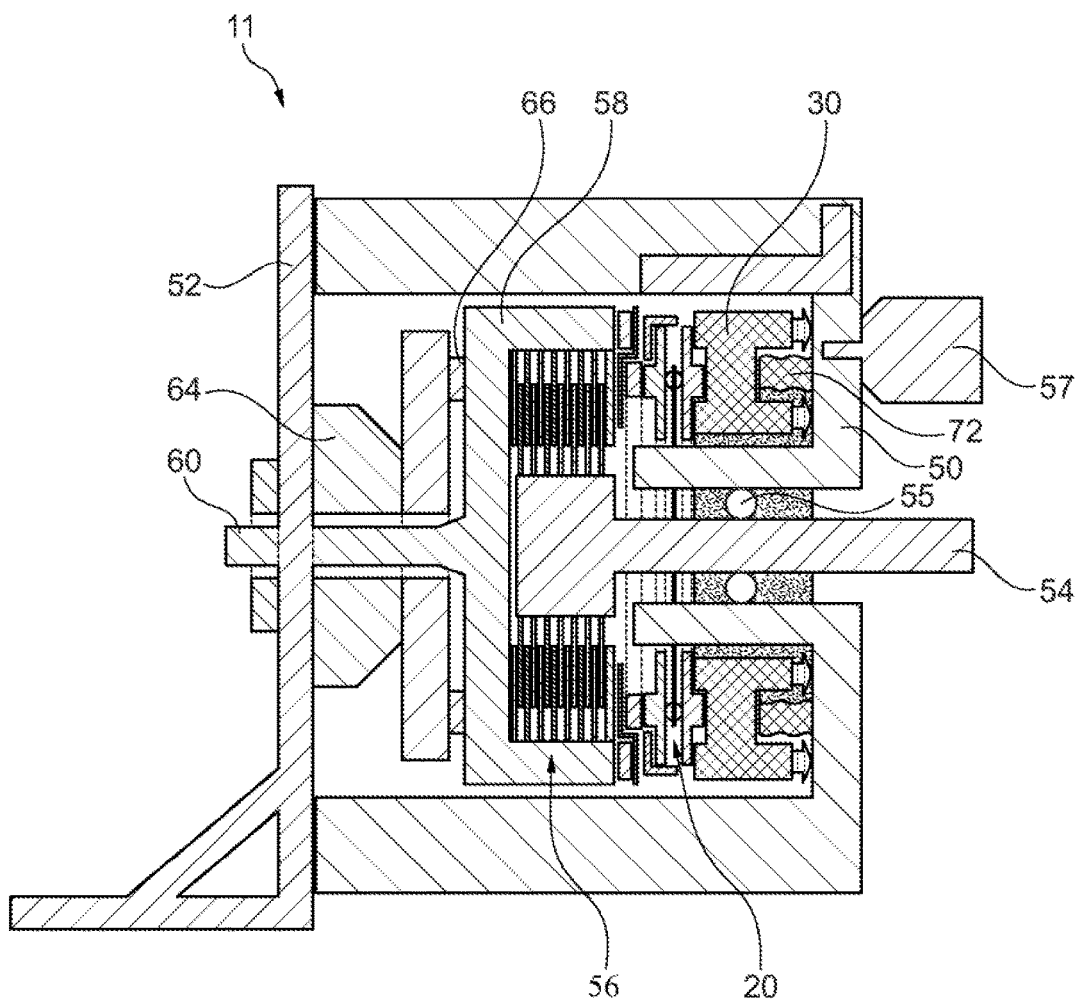
FIG. 2 is a cross-sectional schematic view of a portion of a clutch device having a plate and a spring for compensating axial movement of a clutch actuation device within the clutch, according to one embodiment.

FIG. 2 illustrates a cross-sectional view of a portion of clutch 11 device similar to the clutch device 10 of FIG. 1 now having the mechanical travel compensation disk or plate 30 and surrounding structure. The plate 30 will be described in further detail below. FIG. 3 is an enlarged cross-sectional view of the plate 30 along with the surrounding clutch actuation device 20 and a modified housing 12. As will be described below, the plate 30 along with an associated spring cooperate to limit the axial movement of the clutch actuation device 20 during opening and closing of the clutch.

Figure 3:
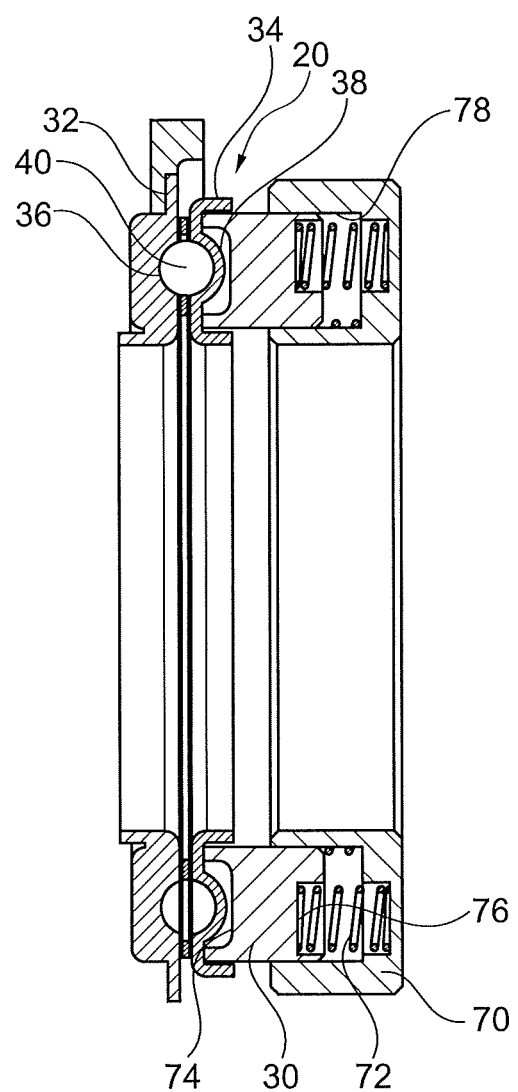
FIG. 3 is an enlarged cross-sectional view of a region of the clutch of FIG. 2 including the clutch actuation device, the plate and the spring.

Referring to FIGS. 2-3, the clutch actuation device 20 is illustrated, which may include a ball ramp clutch as described above. The clutch actuation device of this embodiment includes a first annular disk or plate 32 and a second plate 34 spaced apart from one another. The first plate 32 includes a first groove 36, and the second plate 34 includes a second groove 38. The first and second grooves 36, 38 cooperate to define a pocket that houses a ball or elongated member 40. To engage the corresponding clutch, at least one of the plates is rotated relative to the other about the central axis. This forces the ball or elongated member to change its location within the pocket, causing increased axial separation between the plates 32, 34. For example, the first plate 32 moves toward the left in the orientation shown in FIG. 2, which causes a clutch plates to compress to engage or "lock" the clutch.

Examples of the structure surrounding the clutch actuation device 20 is shown in the clutch 10 of FIG. 1 (without the plate 30 and associated spring) and the clutch 11 of FIG. 2 (with the plate 30 and associated spring described below). A housing 50 surrounds the clutch actuation device 20, and a mounting plate 52 mounts the housing to a driveline or powertrain of the vehicle. An input shaft 54 transmits torque into the clutch 11. The input shaft 54 is radially inward of an array of compressible clutch plates in a clutch pack 56. The input shaft is allowed to freely rotate within the housing 50 via a ball bearing 55. When the clutch actuation device is energized (e.g., by motor 57) to take an expanded position (i.e., when the first and second plates 32, 34 are expanded from one another), the clutch pack 56 compresses to frictionally engage the individual plates with one another. Doing so transfers the torque from the input shaft 54 into a clutch carrier 58 that radially surrounds the clutch pack. The torque transmitted out of the clutch carrier 58 to an output at 60. A bearing support 62, load cell 64, and thrust bearing 66 support the clutch carrier 58.

As explained above, the clutch device 11 is equipped with a mechanical travel compensation disk or plate 30 to limit the axial movement of the clutch actuation device 20. The plate 30, also referred to as a "third plate," is translatable in the axial direction between the second plate 34 of the clutch actuation device 20 and a modified housing 70 that is dimensioned to contain the plate 30. Movement of the plate 30 is limited or dampened by a resilient member such as a spring 72 located axially between the plate 30 and the housing 70. The combined plate 30 and spring 72 cooperate to inhibit axial movement of the second plate 34, thereby compensating any excess axial travel of the clutch actuation device 20. It should be understood that the spring 72 is only one embodiment of a resilient member. The resilient member can be any mechanical member that provides a biasing force, as known to those skilled in the art.

The plate 30 has a first surface 74 facing the second plate 34, and an opposing second surface 76 facing the spring 72. Each surface defines a groove or recess therein to give the plate 30 a cross-sectional profile that is generally H-shaped or, from the perspective of FIGS. 2-3, I-shaped. The recess in the first surface 74 receives an outer, convex surface of the second groove 38. This allows the third plate 30 to contact the second plate 34 at regions radially inside and outside of the groove 38 so as to not be influenced by the groove 38 as the second plate rotates about or travels linearly along the central axis. The recess in the second surface 76 receives the spring 72. This allows the third plate 30 to engage (e.g., in a sliding manner) a corresponding inner surface 78 of the housing 70 while freely allowing the spring 72 to compress and expand.

The plate 30, housing 70, and spring 72 may be retrofitted into an existing clutch. The spring 72 can be tuned depending on the physical characteristics of the clutch 10, 11 and clutch actuation device 20 to create a sufficiently strong resistance force against axial movement of the clutch actuation device 20. This allows a single type of plate to be used in different types of clutches, with only modification of the spring 72 being necessary to alter the resisting force of the plate 30.

The clutch actuation device described above is, in one embodiment, for an all-wheel drive clutch that selectively engages and disengages all-wheel drive in the vehicle by selectively transferring torque through the device and to wheels. But, this disclosure is not limited to such a device.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A clutch for selectively connecting an all-wheel drive system in a vehicle, the clutch comprising:
   a ramped clutch actuation device including first and second plates configured to be variably spaced apart from each other between a first distance and a second distance, at least a portion of the ramped clutch actuation device being configured to rotate to change a distance between the first and second plates from the first distance to the second distance; and
   a third plate adjacent the second plate and configured to limit axial movement of the second plate when the distance between the first and second plates is being changed between the first distance and the second distance;
   wherein the first plate has a first surface facing away from the second plate and facing toward a clutch pack, and the second plate has a second surface facing away from the first plate and contacting the third plate.

2. The clutch of claim 1, further comprising a spring contacting the third plate and configured to limit axial movement of the third plate.

3. The clutch of claim 2, wherein the third plate extends annularly about an axis, and the spring is tuned to inhibit axial movement of the third plate.

4. The clutch of claim 1, wherein the third plate has a first recess facing the second plate that receives a portion of the second plate.

5. The clutch of claim 4, wherein the third plate has a second recess facing away from the second plate.

6. The clutch of claim 5, further comprising a spring partially disposed in the second recess.

7. The clutch of claim 5, wherein the second plate has a groove formed therein having a concave surface supporting a rounded member of the ramped clutch actuation device, wherein the groove defines a convex surface facing away from the concave surface, the convex surface being received within the first recess of the third plate.

8. The clutch of claim 1, wherein the third plate includes a first axially-facing end surface having a first groove defined therein, and a second axially-facing end surface having a second groove defined therein.

9. The clutch of claim 8, wherein the first groove receives a portion of the second plate.

10. A system for compensating axial travel of a clutch actuation device, the system comprising:
    a housing;
    a ramped clutch actuation device, being the clutch actuation device, and including a first plate and a second plate coaxial with the first plate, wherein the second plate is configured to translate axially relative to the first plate;
    a third plate between the second plate and the housing;
    a resilient member located axially between the second plate and the housing, the resilient member configured to inhibit the axial translation of the second plate;
    wherein the first plate has a first surface facing away from the second plate and facing toward a clutch pack, and the second plate has a second surface facing away from the first plate and contacting the third plate.

11. The system of claim 10, wherein the resilient member is a spring located between and contacting the third plate and the housing.

12. The system of claim 10, wherein the third plate includes a first axial side facing the second plate and a second axial side facing the housing, the second side including a recess that receives the resilient member.

13. The system of claim 10, wherein the second plate includes a groove with a ramped profile for containing a rounded member between the first and second plates, the third plate includes a first side facing the second plate and a second side facing the housing, and the first side includes a recess that receives the ramped profile of the groove.

14. The system of claim 10, wherein the third plate includes a first side facing the second plate and a second side facing the housing, and wherein the first and second sides each define a recess.

15. The system of claim 10, wherein the third plate contacts the second plate such that the third plate compresses the resilient member as the second plate is moved away from the first plate.

16. A clutch actuation device comprising:
    a first plate defining a first groove with a ramped profile;
    a second plate coupled to the first plate and defining a second groove with a ramped profile;
    a third plate contacting the second plate;
    a rounded member disposed within the first and second grooves and configured to cause axial movement of the second plate relative to the first plate as the rounded member translates along the ramped profiles of the first and second grooves; and
    a resilient member contacting the third plate and configured to limit the axial movement of the second plate;
    wherein the third plate includes a first axially-facing end surface having a first recess defined therein, and a second axially-facing end surface having a second recess defined therein.

17. The clutch actuation device of claim 16, wherein the resilient member is disposed axially between the second plate and a housing and within one of the first and second recesses.

18. The clutch actuation device of claim 17, wherein the third plate has an H-shaped cross-sectional profile.

19. The clutch actuation device of claim 17, wherein one of the first and second recesses receives the ramped profile of the second groove.

* * * * *